United States Patent Office 2,978,352
Patented Apr. 4, 1961

2,978,352

PRODUCTION OF TRIARYLMETHANE COLORS

Ray Allen Clarke, Pitman, N.J., assignor to E. I. du Pont de Nemours and Company, Wilmington, Del., a corporation of Delaware No Drawing. Filed July 25, 1957, Ser. No. 674,039

2 Claims. (Cl. 117—36)

This invention relates to a step in the process of production of triarylmethane colors and to coated sheet material particularly adapted for this purpose. More particularly, this invention deals with triarylmethane colors which are useful in the art of making so-called "carbon" paper or similar coated webs which are used in duplication processes for handwritten or typewritten records. Such triarylmethane compounds may be represented generally by the formula

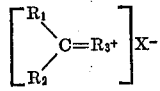

wherein two of the R's are benzenoid aryl compounds which usually have amino (primary, secondary or tertiary) or hydroxy substituents but often carry also other substituents such as chloro, bromo, nitro, methoxy, carboxy and sulfo; the third R is a benzene or naphthalene radical which may contain substituents as above set forth, while X is the anion of an acid such as hydrochloric, sulfuric, phosphoric or acetic. X may also represent the anion of a sulfo or carboxy group attached to one of the aryl radicals R.

As typical illustrations of the dyes customarily encountered in commerce and coming under the above general formula may be mentioned: ethyl violet, methyl violet, victoria blue, malachite green, etc.; but it will be understood that these examples are brought in at this point purely for the purpose of clarifying the discussion and not for the purpose of limiting the field of this invention.

Various methods of synthesis have been devised heretofore for manufacturing triarylmethane colors, of which again solely by way of illustration will be mentioned the synthesis of ethyl violet by starting with 1 mole of p-diethylamino-benzaldehyde and 2 moles of diethylaniline, and the synthesis of an analogous triphenylmethane compound by reacting 1 mole of di(p-dimethylaminophenyl)-hydrol with 1 mole of diethylaniline. In most such syntheses, however, the dye product is not obtained directly but only via an intermediate colorless compound which is in a lower stage of oxidation or which does not have the salt form above indicated. Two such stages commonly encountered in practice are:

The leuco form

and

The carbinol form

It will be noted that the leuco form is a lower oxidation stage than the carbinol form, while the latter differs from the dye in the same sense as a base (say NH$_4$OH) differs from its salts (say NH$_4$Cl).

Other colorless intermediate forms are often deliberately manufactured, as for instance:

Lower alkyl ethers of the carbinol, which may be represented as

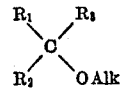

wherein Alk is an alkyl radical of not over 6 C-atoms; and the lactone or phthalide form

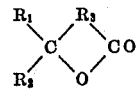

which of course can result only when the aryl radical R$_3$ originally possesses a COOH group in ortho-position to the methane C-atom.

The said various colorless stages have recently become an object of manufacture per se, for the purpose of producing so-called white carbon papers or similar non-staining duplication devices. See in particular, U.S. Patents Nos. 2,755,200, 2,755,202 and Re. 23,024.

This invention, then, deals with a process of converting intermediate colorless triarylmethane compounds of the above types into final color.

It is an object of this invention to provide a method of conversion which shall be applicable both to manufacturing the color in bulk or to its conversion when it is in the form of a thin film, as a character or symbol upon a sheet of copy material. Another object is to provide a method of conversion which shall be applicable to any of the aforegoing forms, regardless of their stage of oxidation or of the nature of the substituents in the aryl nuclei. A still further object is to provide a process wherein treatment with a single agent at a controlled pH shall result directly in the dye salt, whether or not an acid is added. Another related object is to provide copy paper specially adapted for developing the color of characters impressed thereon in accordance with this invention. Various additional objects and achievements of this invention will become apparent as the description proceeds.

Now according to this invention, the above objects are achieved neatly and efficiently by reacting the colorless triarylmethane compound with a metal ferricyanide of the group consisting of copper, silver, zinc, cadmium, and mercury ferricyanides. I find that these five agents are particularly effective for converting the mentioned intermediates into color. Moreover, when one of these agents is used, there is no need for adding acid, regardless whether the process is applied to a leuco compound, carbinol, carbinolalkyl ether or phthalide.

My observations above are particularly surprising when it is considered that alkali-metal ferricyanides, chromium ferricyanide and many other metal ferricyanides are practically ineffective for the specified purpose.

The mode of applying my preferred metal ferricyanide to the colorless intermediate may vary with the purpose in hand or quantity of material treated. Thus one procedure for producing the color in bulk is to dissolve the leuco triarylmethane derivative in a solvent such as methanol or acetone containing zinc chloride and to add an aqueous alcohol solution of sodium or potassium ferricyanide. The dye, which forms immediately and is soluble in the alcohol solution, is separated from the precipitate of zinc ferricyanide by filtration and is isolated by evaporation of the solvent. Another procedure is to treat the hydrochloride salt of the leuco in an aqueous solution containing zinc chloride and again form the dye by the addition of the alkali metal ferricyanide. In this case the dye usually is precipitated with the zinc ferricyanide and is separated by extraction with a solvent such as alcohol or acetone. A third procedure is to circulate continuously a solution of the leuco (using a suitable solvent, such as alcohol or acetone) through a relatively stationary bed of the insoluble metal ferricyanide. By alcohol here, I mean methanol or ethanol.

Depending upon the particular leuco selected and the metal ferricyanide, the reaction may be carried out at temperatures which may vary from room temperature to the boiling point of the solvent (i.e., 60 to 100° C.). Thus essentially complete oxidation of most leuco triarylmethane dyes with zinc ferricyanide is obtained at room temperature, while complete oxidation with cupric ferricyanide is obtained by increasing the temperature to approximately 60° C.

Although one mole of the leuco compound is oxidized to the dye by one mole of the metal ferricyanide, in practice a 25 to 100 percent molar excess of the metal ferricyanide is preferred to assure complete oxidation. In addition, it has been observed that a one-half to two mole excess of the soluble salt of the chosen metal over that required to form the meatl ferricyanide gives slightly higher conversion of the leuco derivative to the dye. The aqueous or alcoholic suspension of the metal ferricyanide as prepared from the soluble metal salt and potassium ferricyanide will generally have a pH in the range of 4 to 6.5; however, acidic substances may be added to reduce the pH as low as 0.5 and, on the contrary, mildly basic materials may be added provided the pH of the suspension does not rise above 7.

Where the process is to be carried out on the surface of a copy sheet for the purpose of developing an impressed record thereon, it suffices to merely bring the colorless intermediate and metal ferricyanide together forcefully, as by the impact of a typewriter key or the pressure of a pencil point. To effect such bringing together, the metal ferricyanide is preferably coated onto the copy sheet by the aid of a suitable binder, for instance starch or methyl cellulose, while the colorless coloring agent is contained in the waxy coating of a colorless duplicating paper (commonly called "carbon" paper) employed for the purpose.

In making hectograph copies from a stencil, the coated copy sheet which carries the ferricyanide is moistened with a suitable alcoholic liquid, for instance ethanol, and is pressed in the machine against the imprinted surface of a stencil whose invisible characters contain within them the undeveloped colorless triarylmethane compound.

Furthermore, in this case production of the metal ferricyanide in situ is also feasible, as for instance by coating the copy paper with an alkali-metal ferricyanide, and then putting a water-soluble salt of the selected metal, say zinc chloride, in the alcoholic moistening medium or in the waxy coating of the "carbon" from which the imprint is made upon the stencil.

For the purpose of preparing coated copy paper, it is preferable to select zinc ferricyanide, both for economic reasons and for the excellent results obtained therewith. Cupric ferricyanide tends to discolor the paper, and is useable only where a brownish background on the copy paper is not objectionable. On the other hand, whitening agents, fillers, humectants, non-volatile oragnic liquids, waxy dispersing agents, and other additives may be incorporated in the coating, with any of the aforegoing metal ferricyanides, to produce various collateral effects where such are desired. Indeed, it has been found that inert fillers such as china clay or titanium dioxide have the effect of intensifying the developed color on the copy sheet. Coloring materials other than the colorless triarylmethane compounds above mentioned may also be added, for the purpose of shading the developed color or for the purpose of producing a contrasting background in the copy sheet.

A particularly desirable class of additives is represented by non-volatile, water-soluble, organic liquids having humectant properties, as illustrated by glycerol, diethylene glycol, polyalkylene glycols, and ethylene oxide condensation products with long-chain alcohols or with alkyl phenols. Commercially available representatives of the last three classes are polyethylene glycols of molecular weights 300, 600 and 1000; the condensation product of one mole of oleyl alcohol with 20 moles of ethylene oxide, and the various, commercially available, ethylene oxide-alkyl phenol condensation produces. I find that when organic liquids of the above class are incorporated in a paper coating containing zinc ferricyanide, the speed of development of the eventually imprinted characters and their intensity are greatly improved.

The quantity of coating to be applied to the copy paper is best expressed by weight of the zinc ferricyanide per unit surface of the paper, and may vary from 5 grams to 500 grams per 1000 square feet.

Without limiting this invention, the following examples are given to illustrate my preferred mode of operation. Parts and percentages mentioned are by weight.

*Example 1.—Preparation of color in bulk*

To 10.0 parts of (o-chlorophenyl)-bis(4-ethylamino-m-tolyl)methane (95% purity; 0.0242 mole) are added 7 parts (0.07 mole) of concentrated hydrochloric acid and the mixture is warmed slightly to form the water soluble dihydrochloride salt. A solution consisting of 13 parts (95% purity; 0.09 mole) of zinc chloride in 400 parts of water is then added and is followed by a solution of 20 parts (0.061 mole) of potassium ferricyanide in 400 parts of water. There is an immediate precipitation of the dye as well as excess zinc ferricyanide. The solid material is filtered off, and stirred into 395 parts of acetone, containing 13.5 parts of concentrated ammonium hydroxide (28% $NH_3$), to form a deep blue solution of the dye. Any residual insoluble material is filtered off and reslurried in 315 parts of acetone to extract additional dye. The acetone-dye filtrates are combined into one solution, which has a pH of 8.4. The acetone is removed by evaporation, and the residue, of jelly-like consistency, is dissolved in 25 parts of glacial acetic acid and diluted with 2500 parts of hot water. The dye is precipitated from this solution by the addition of 100 parts of sodium chloride, then it is filtered off and air dried. Spectrophotometric analysis indicates this product has the same spectrotransmittance curve as the known commercial dye (Color Index No. 663), and its purity is 75%.

*Example 2.—Preparation of color in acetone solution*

To a solution of 32.9 parts (0.1 mole) of potassium ferricyanide in 200 parts water is added a solution of 20.4 parts (0.15 mole) of zinc chloride in 200 parts water. The yellow-orange zinc ferricyanide precipitate formed is filtered off, washed with water and dried at room temperature. When one part of the dry yellow-orange powder is dispersed in 20 parts of a 1% by weight solution of (o-chlorophenyl)bis(4-dimethylaminophenyl)-methane in acetone, the solution immediately turns an intense color, which corresponds to the color of Colour Index Dye No. 658. If it is desired to obtain the color in bulk, the residual zinc ferricyanide is filtered off, and the acetone-dye filtrate is treated further as in Example 1.

Laboratory tests showed that the zinc-ferricyanide dispersion formed in the first part of this example had a pH of 4.0 and an oxidation potential (determined by platinum-calomel electrodes) of 880 millivolts. Similar tests on repeated procedures as in Example 2, except that buffers were added to the zinc ferricyanide prior to its entry into the acetone solution of the leuco triarylmethane compound, showed that the added buffers affected both the pH and the oxidation potential of the aqueous zinc ferricyanide, and that the potency of the latter for oxidizing into dye the mentioned leuco compound vanished if the pH of its aqueous dispersion (prior to incorporation into the acetone solution of the leuco color substance) is allowed to rise above 7.0 and if its oxidation potential is allowed to drop below about 600 millivolts. Addition of mineral acids, on the other hand (such as hydrochloric, acetic, phosphoric), which may drop the pH to values of the order of 1.5 to 2.8, and raises the oxidation potential to as high as 920 millivolts, produces good results.

*Example 3*

By procedures essentially as in Example 2, it has been ascertained that the ferricyanides obtained by reacting potassium ferricyanides with any one of the following salts produce good results in the oxidation of leuco-triarylmethane compounds to the corresponding colors:

Mercuric chloride,
Zinc sulfate,
Cupric chloride dihydrate,
Cupric sulfate pentahydrate,
Cadmium chloride, and
Silver nitrate.

In all cases the pH of the ferricyanide suspension prior to use on the leuco compound was below 4.7, and its oxidation potential was above 650 millivolts. The mercuric ferricyanide suspension obtained in these procedures had an oxidation potential (measured by platinum-calomel electrodes) of 960 millivolts.

In the cases of the ferricyanides of cadmium and silver the results will sometimes vary with the nature of the leuco compound being treated. On a scale adopted as standard for the purpose of these experiments, the potencies of these two ferricyanides rated "Good" when the leuco substance was tris(p-diethylaminophenyl)-methane, but only "Fair" when the leuco compound named in Example 1 was employed. All the other ferricyanide preparations indicated above rated "Good" for both leuco compounds.

*Example 4*

To a solution of 1.1 parts of potassium ferricyanide in 10 parts of water are added 2.5 parts of an aqueous, 20% starch solution and a solution of 2.3 parts of zinc chloride in 10 parts of water. The resulting zinc ferricyanide dispersion is spread in a thin film upon paper, and when dried constitutes an effective surface for converting leuco triarylmethane dye-derivatives to the dye, on impact, when the leuco is incorporated into a carbon paper.

The requisite leuco coated carbon paper for use with the above copy paper may be prepared as follows: Five parts of a 5% by weight solution of the leuco compound in chlorinated biphenyl solvent are emulsified in 10 parts of an aqueous, 20% casein solution. The resulting viscous emulsion is diluted with 10 parts of water and is coated on paper. The dried leuco-coated paper thus obtained is used in the manner of a carbon paper. That is, it is placed over a coated copy sheet prepared as above, the two coated faces being in contact with each other, and writing with a stylus or typing is done on the uncoated face of the leuco-coated paper. The pressure or impact automatically produces the writing in color on the copy sheet.

In this manner, leuco coated papers have been prepared from the leuco compounds named hereinbelow, tested with the above copy paper, and found to give good results:

(a) (o - Chlorophenyl)bis(p - dimethylaminophenyl)methane
(b) Bis(4-amino-m-tolyl)(o-chlorophenyl)methane
(c) (o-Chlorophenyl)bis(4-ethylamino-m-tolyl)methane
(d) Bis(4 - amino - 3,5 - diethylphenyl)(o - chlorophenyl)methane
(e) Bis(p-dimethylaminophenyl)(phenyl)methane
(f) Bis[p - (β - cyanoethyl)methylaminophenyl](phenyl)methane
(g) Bis(4-amino-3,5-xylyl)(p-methoxyphenyl)methane
(h) Tris(p-diethylaminophenyl)methane
(i) Bis(p - diethylaminophenyl)(p - dimethylaminophenyl)methane
(j) Bis(p - benzylethylaminophenyl)(p - diethylaminophenyl)methane
(k) Bis(p - diethylaminophenyl)(4 - ethylamino - 1 - naphthyl)methane
(l) (4 - diethylamino - o - tolyl)bis(4 - ethylamino - m - tolyl)methane
(m) (p - Diethylaminophenyl)bis(4 - ethylamino - m - tolyl)methane
(n) (p - Diethylaminophenyl)bis(4 - diethylamino - o - tolyl)methane
(o) Tris(4-diethylamino-o-tolyl)methane.

*Example 5*

An alternative method for applying the leuco compounds to paper consists of adding 10 parts of the leuco compound to 90 parts of a wax melt of the following composition:

| | Parts |
|---|---|
| Cetyl alchol | 73 |
| White mineral oil ("Nujol") | 20 |
| Stearylamine | 3 |
| Aluminum stearate | 4 |
| Total | 100 |

The resulting solution or dispersion of the leuco compound in the wax melt is coated, while hot, on paper and allowed to cool. Using the resulting coated paper in the same manner as in Example 4, with the coated copy paper prepared in Example 4, the following leuco compounds were tested and found to give good results:

(p) (p - Dimethylaminophenyl)bis[4 - (m - sulfobenzylethylamino)-o-tolyl]methane, disodium salt
(q) Bis(4 - ethylamino - m - tolyl)(o - sulfophenyl)methane, monosodium salt.

*Example 6*

Paper coated with the carbinol stage of a triarylmethane dye and suitable for use as "carbon" paper with the coated copy sheet of Example 4, may be prepared as follows: Five parts of a 5% solution of the selected carbinol derivative in chlorinated biphenyl solvent to which has been added 0.25 part of cetyl amine, are emulsified in 10 parts of an aqueous, 20% casein solution. The resulting viscous emulsion is diluted with 10 parts of water and is coated on paper. The paper is then dried. When tris(p-dimethylaminophenyl)carbinol or bis(p-dimethylaminophenyl)-(phenyl)carbinol is thus incorporated and placed facing zinc ferricyanide coated copy paper obtained as in Example 4, and tested by writing or typing as in Example 4, a violet (crystal violet) or green (malachite green) impression, respectively, is obtained on the copy paper.

*Example 7*

The leuco derivatives named in Example 4 can be formulated into a wax formulation for a hectograph carbon paper. The general procedure is to disperse or dissolve the leuco into a wax melt of a suitable composition at about 100° C. The melt is allowed to solidify and is then milled on an ink mill by subjecting the same to 6 to 12 passes. Where the leuco compound is soluble in the melt, milling is not necessary. A typical formulation for the wax melt is as follows:

3 parts of stearyl amine,
53 parts of cetyl alchol,
11 parts of white mineral oil, and
33 parts of the leuco derivative.

The hectograph carbon paper is prepared by heating the wax melt to 100° C., and coating same on paper from a heated metal plate maintained at 100° to 120° C., using a wire-wound coating rod, to yield a coating thickness of from 0.0008 to 0.0012 inch.

A "master" is prepared from the hectograph carbon paper by typing or writing on the "master" whereby a portion of the hectograph coating is transferred to the back of the "master." Copies are then prepared from the "master" in the usual way but using the coated copy paper obtained in Example 4 and ordinary duplicating fluid, which contains mainly ethanol. Under these conditions, the color development on the copy paper is practically instantaneous.

*Example 8.—Preparation of copy paper*

0.720 part of zinc chloride are dissolved in 5 parts of water and added to a solution of 1.1 parts of potassium ferricyanide in 5 parts of water. The resulting thick, colloidal, yellow-orange dispersion is diluted with 5 parts of an aqueous, 12.5% starch solution. This final dispersion is coated on paper to form on drying a light yellow-orange coating on the surface. Paper thus coated serves as copy paper for converting to color, the impact transfer from the carbon papers of leuco or carbinol triarylmethane dye-derivatives described in Examples 4 to 6.

*Example 9.—Use of fillers*

To 5.0 parts of the zinc ferricyanide aqueous dispersion of Example 4 is added 1.0 part of domestic china clay. The dispersion is stirred well, coated on paper and dried. The copy paper prepared in this manner is a pleasing light yellow color. If a carbon paper coated with an emulsion containing (o-chlorophenyl)bis(4-ethylamino-m-tolyl)-methane (prepared as in Example 4) is placed facing the copy paper, and impact or pressure is applied to the carbon paper, a rapid and intense color development occurs on the copy paper. The color development on copy paper coated with the ferricyanide-clay dispersion is more rapid and intense than on copy paper coated with zinc ferricyanide dispersion only.

The copy paper prepared in this example is likewise an effective oxidizing copy paper for carbon papers prepared from the other leuco triarylmethane compounds listed in Example 4.

*Example 10*

A copper ferricyanide dispersion is prepared as follows: 0.75 part of cupric chloride dihydrate are dissolved in 10 parts of water, and 3.0 parts of domestic china clay are added. A second mixture is prepared by dissolving 1.1 parts of potassium ferricyanide in 10 parts of water and dispersing well into this solution 3.0 parts of an aqueous 25% starch solution. The addition of the potassium ferricyanide-starch mixture to the cupric chloride-clay mixture results in a yellow dispersion of cupric ferricyanide. This dispersion is coated on paper and, on drying, the coated paper becomes light brown in color. Paper thus coated is effective oxidizing copy paper for producing color development from impact when this copy paper is placed facing the carbon papers containing the various leuco triarylmethane dye-derivatives listed in Example 4.

*Example 11.—Preparation of zinc ferricyanide from hydroferricyanic acid*

To a solution of 25 parts of potassium ferricyanide dissolved in 100 parts of water are added 54.5 parts of an aqueous, 30% solution of fluosilicic acid ($H_2SiF_6$). The mixture is allowed to stand for one hour in an ice bath. The potassium silicofluoride ($K_2SiF_6$) which precipitates is filtered off and washed with 40 parts of ethyl alcohol. The resulting filtrate, which is an aqueous alcohol solution of hydroferricyanic acid, is added to a solution of 30.8 parts of zinc chloride in 300 parts of water. A yellow-orange dispersion of zinc ferricyanide possessing an oxidation potential of 830 millivolts and a pH of 1.2 is formed. The zinc ferricyanide is filtered off, washed with water, and air dried.

When a small portion of the dry zinc ferricyanide is spotted with a few drops of a 1% by weight solution of (o-chlorophenyl)bis(4-ethylamino-m-tolyl)methane in acetone, an immediate dark blue coloration of the dye is observed.

*Example 12.—Incorporation into copy paper*

To a dispersion of 0.45 part of zinc ferricyanide, prepared as in Example 11, in 15 parts of water are added 4 parts of an aqueous, 12.5% starch solution and 2 parts of polyethylene glycol of molecular weight 300. The starch acts as a binder to hold the zinc ferricyanide to paper and the polyethylene glycol serves as a humectant. The humectant keeps a small amount of moisture in the paper coating thereby increasing the speed of development of color from the leuco compound in a carbon paper. The above dispersion is coated on paper and the latter is dried. The resulting light yellow sheet is an efficient oxidizing copy paper for impressed characters received from carbon sheets coated with (o-chlorophenyl)bis(4-ethylamino-m-tolyl)methane as in Example 4, and produces an immediate coloration upon such impression.

It will be understood that the details of the above examples may be varied widely within the skill of those engaged in this art. A particularly noteworthy variation is the use of my novel coated copy paper with carbon paper whose coloring agent is a lower alkyl ether of the carbinol or a phthalide of the formula hereinabove indicated. Such carbon paper may be prepared by the methods indicated in Examples 4, 5 and 6 above. I find that the zinc-ferricyanide coated copy paper of this invention develops color rapidly and to a satisfactory intensity with these other varieties of carbon paper. A specific illustration is a commercial carbon paper whose coloring agent is crystal violet lactone [i.e. 3,3-bis(p-dimethylaminophenyl)-6-dimethylamino-phthalide]. The expected violet color is obtained immediately on the zinc ferricyanide copy paper when an impact such as from typewriting or writing is made.

I claim as my invention:

1. A process of converting into color a colorless triarylmethane compound of the group consisting of leuco-triarylmethanes, triarylmethane carbinols, lower alkyl ethers of triarylmethane carbinols and inner carboxy esters of triarylmethane carbinols, which comprises reacting said colorless compound, in the absence of other oxidizing agents, with a metal ferricyanide of the group consisting of cupric ferricyanide, silver ferricyanide, zinc ferricyanide, cadmium ferricyanide and mercuric ferricyanide.

2. A process as in claim 1, said ferricyanide being evenly distributed on a sheet of copy paper in quantity from 5 to 500 grams per 1000 square feed of the paper.

References Cited in the file of this patent

UNITED STATES PATENTS

| | | |
|---|---|---|
| 1,214,940 | Miller | Feb. 6, 1917 |
| 1,279,248 | Bullock | Sept. 17, 1918 |
| 1,279,276 | Crabtree | Sept. 17, 1918 |
| 2,151,065 | Allison | Mar. 21, 1939 |
| 2,324,060 | Boughton | July 13, 1943 |
| 2,611,700 | Brunner et al. | Sept. 23, 1952 |
| 2,755,200 | Balon et al. | July 17, 1956 |
| 2,755,203 | Stallman | July 17, 1956 |
| 2,813,042 | Gordon et al. | Nov. 12, 1957 |
| 2,833,612 | Almy | May 6, 1958 |

UNITED STATES PATENT OFFICE
CERTIFICATION OF CORRECTION

Patent No. 2,978,352            April 4, 1961

Ray Allen Clarke

It is hereby certified that error appears in the above numbered patent requiring correction and that the said Letters Patent should read as corrected below.

Column 3, line 24, for "meatl" read -- metal --; column 4, line 11, for "produces" read -- products --; column 6, line 37, for "(p-Dimethylaminophenyl)" read -- (p-Diethylaminophenyl) --; column 8, line 59, for "feed" read -- feet --.

Signed and sealed this 22nd day of August 1961.

(SEAL)
Attest:

ERNEST W. SWIDER
Attesting Officer

DAVID L. LADD
Commissioner of Patents